United States Patent
McGrew et al.

(10) Patent No.: US 10,257,214 B2
(45) Date of Patent: Apr. 9, 2019

(54) USING A MACHINE LEARNING CLASSIFIER TO ASSIGN A DATA RETENTION PRIORITY FOR NETWORK FORENSICS AND RETROSPECTIVE DETECTION

(71) Applicant: Cisco Technology, Inc., San Jose, CA (US)

(72) Inventors: David McGrew, Poolesville, MD (US); Blake Harrell Anderson, San Jose, CA (US); K. Tirumaleswar Reddy, Bangalore (IN); Prashanth Patil, Mountain View, CA (US); Daniel G. Wing, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 190 days.

(21) Appl. No.: 15/191,152

(22) Filed: Jun. 23, 2016

(65) Prior Publication Data
US 2017/0374090 A1    Dec. 28, 2017

(51) Int. Cl.
| G06F 17/00 | (2006.01) |
| G06F 12/14 | (2006.01) |
| H04L 9/32 | (2006.01) |
| G06F 11/30 | (2006.01) |
| G06F 7/00 | (2006.01) |

(Continued)

(52) U.S. Cl.
CPC ....... *H04L 63/1425* (2013.01); *G06N 99/005* (2013.01); *H04L 12/4641* (2013.01); *H04L 41/16* (2013.01); *H04L 43/026* (2013.01); *H04L 43/04* (2013.01); *H04L 47/2483* (2013.01); *H04L 47/31* (2013.01); *H04L 63/145* (2013.01); *H04L 63/1458* (2013.01)

(58) Field of Classification Search
CPC ... H04L 63/1425; H04L 69/322; H04L 67/10; H04L 47/31; H04L 47/2483; H04L 12/4641; H04L 63/145; G06N 99/005
USPC ....... 726/23, 13, 25; 713/168, 188; 707/662, 707/663; 706/12, 13
See application file for complete search history.

(56) References Cited

U.S. PATENT DOCUMENTS

| 8,418,249 B1 | 4/2013 | Nucci et al. |
| 9,749,355 B1 * | 8/2017 | Benson ............... H04L 63/1441 |

(Continued)

FOREIGN PATENT DOCUMENTS

EP    2908485 A1    8/2015

OTHER PUBLICATIONS

McGrew et al. "Understanding network traffic through Intraflow data" Cisco; FloCon 2016; pp. 1-33.
(Continued)

*Primary Examiner* — Aravind K Moorthy
(74) *Attorney, Agent, or Firm* — Behmke Innovation Group LLC; James Behmke; Stephen D. LeBarron

(57) ABSTRACT

In one embodiment, a device in a network receives traffic data regarding one or more traffic flows in the network. The device applies a machine learning classifier to the traffic data. The device determines a priority for the traffic data based in part on an output of the machine learning classifier. The output of the machine learning classifier comprises a probability of the traffic data belonging to a particular class. The device stores the traffic data for a period of time that is a function of the determined priority for the traffic data.

17 Claims, 9 Drawing Sheets

(51) Int. Cl.
*G06F 15/18* (2006.01)
*H04L 29/06* (2006.01)
*H04L 12/833* (2013.01)
*H04L 12/851* (2013.01)
*H04L 12/46* (2006.01)
*G06N 99/00* (2019.01)
*H04L 12/24* (2006.01)
*H04L 12/26* (2006.01)

(56) References Cited

U.S. PATENT DOCUMENTS

| | | | | |
|---|---|---|---|---|
| 2007/0198702 | A1* | 8/2007 | Bishop | H04W 40/02 709/224 |
| 2009/0292729 | A1* | 11/2009 | Blount | G06N 5/042 |
| 2010/0054241 | A1* | 3/2010 | Shah | H04L 45/00 370/389 |
| 2011/0040706 | A1* | 2/2011 | Sen | G06N 99/005 706/12 |
| 2011/0138463 | A1* | 6/2011 | Kim | H04L 63/1425 726/22 |
| 2012/0066473 | A1* | 3/2012 | Tremaine | G06F 12/06 711/206 |
| 2013/0347103 | A1 | 12/2013 | Veteikis et al. | |
| 2014/0012940 | A1* | 1/2014 | Joshi | G06F 9/45558 709/214 |
| 2015/0332155 | A1* | 11/2015 | Mermoud | G06N 5/048 706/12 |
| 2015/0370723 | A1 | 12/2015 | Nambiar et al. | |
| 2017/0026391 | A1* | 1/2017 | Abu-Nimeh | H04L 63/1416 |

OTHER PUBLICATIONS

"Using Lancope StealthWatch for InformationSecurity Monitoring" Cisco; IT Case Study; Feb. 2014; pp. 1-7.

Tegeler et al. "BotFinder: Finding Bots in Network Traf?c Without Deep Packet Inspection" 2012; 7 pages.

* cited by examiner

USING A MACHINE LEARNING CLASSIFIER TO ASSIGN A DATA RETENTION PRIORITY FOR NETWORK FORENSICS AND RETROSPECTIVE DETECTION

TECHNICAL FIELD

The present disclosure relates generally to computer networks, and, more particularly, to using a machine learning classifier to assign a data retention policy for network forensics and retrospective detection mechanisms.

BACKGROUND

Computer networks are carrying an ever increasing number of traffic flows with diverse characteristics. In many cases, these characteristics are benign, such as the application associated with a particular traffic flow. In other cases, traffic flows can also exhibit malicious characteristics, such as flows associated with malware, data exfiltration, denial of service (DoS) attacks, etc.

Capturing traffic characteristics improves the functioning of the network by enabling network devices and network administrators to adjust the operations of the network dynamically. For example, a router or other networking device may leverage information about the application associated with a particular traffic flow, to prioritize communication of the flow (e.g., video conferencing traffic may be much more sensitive to jitter or delays than that of email traffic). In another example, a networking device may use the captured traffic information to detect, and often prevent, network attacks and other anomalies in the network. In both examples, classification is typically performed in real-time or in near real-time, allowing the network to adapt quickly to changes in the traffic flows and the traffic flow characteristics that are present in the network.

Network forensics and retrospective detection are techniques that can further enhance the assessment of captured traffic characteristics. In contrast to mechanisms that evaluate network traffic flows as they occur, forensics and retrospective detection techniques leverage historical information about the traffic flows. For example, one system may retroactively detect a subtle and previously unseen form of network attack that occurs over the course of time by analyzing historical traffic flow characteristics. However, it is unfeasible to retain all traffic data indefinitely due to system resource constraints.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
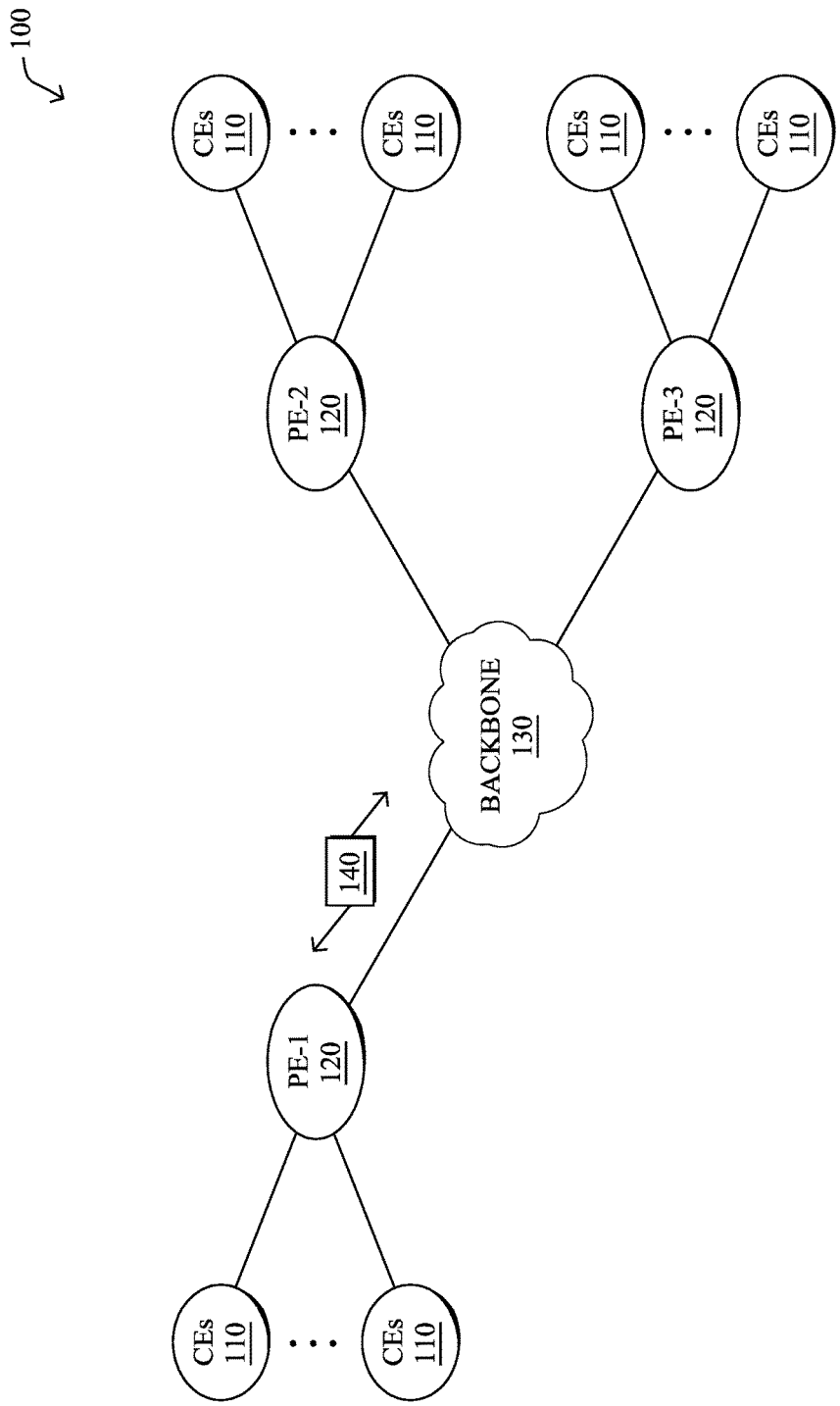
FIGS. 1A-1B illustrate an example communication network.

According to one or more embodiments of the disclosure, a device in a network receives traffic data regarding one or more traffic flows in the network. The device applies a machine learning classifier to the traffic data. The device determines a priority for the traffic data based in part on an output of the machine learning classifier. The output of the machine learning classifier comprises a probability of the traffic data belonging to a particular class. The device stores the traffic data for a period of time that is a function of the determined priority for the traffic data.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
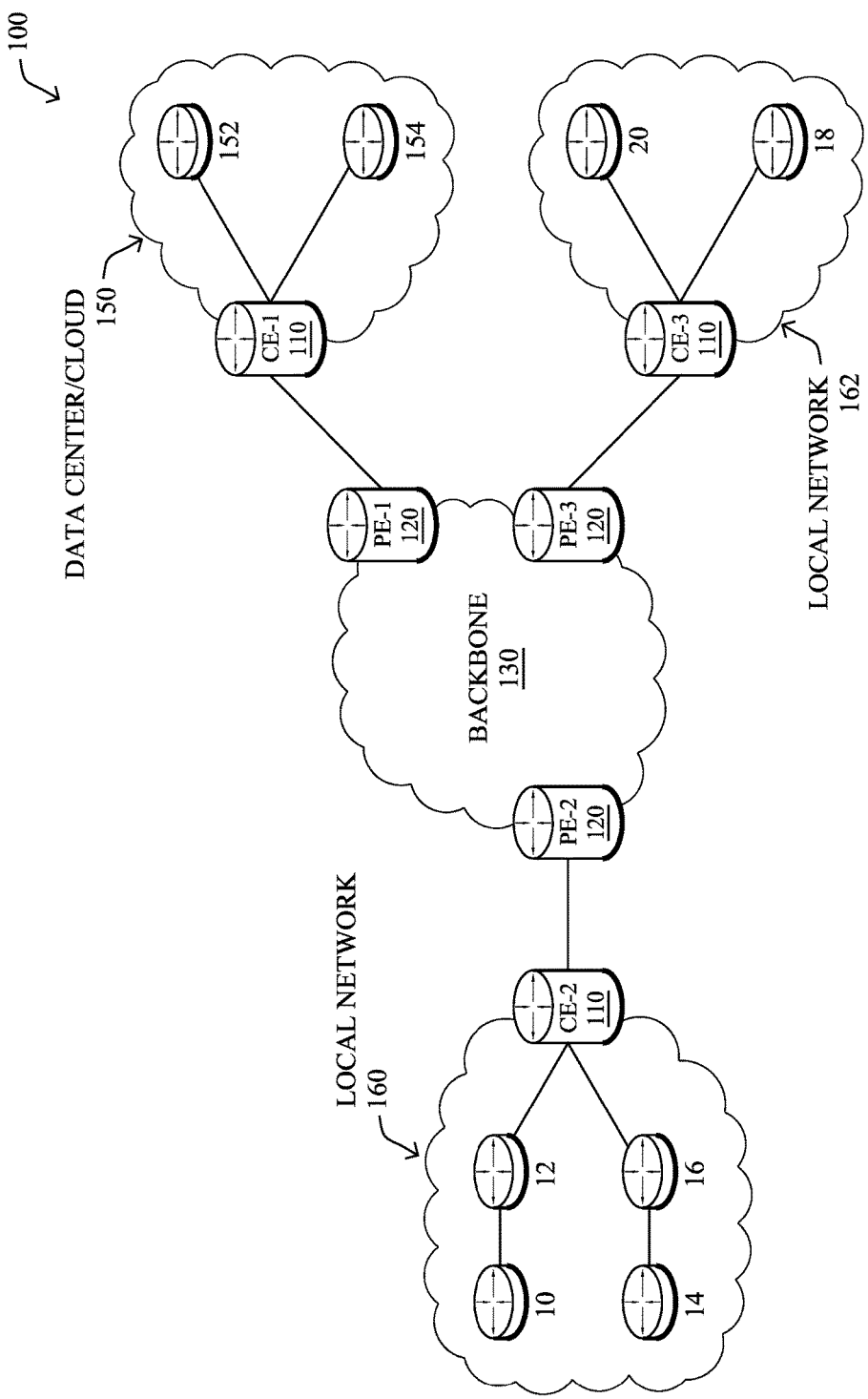

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
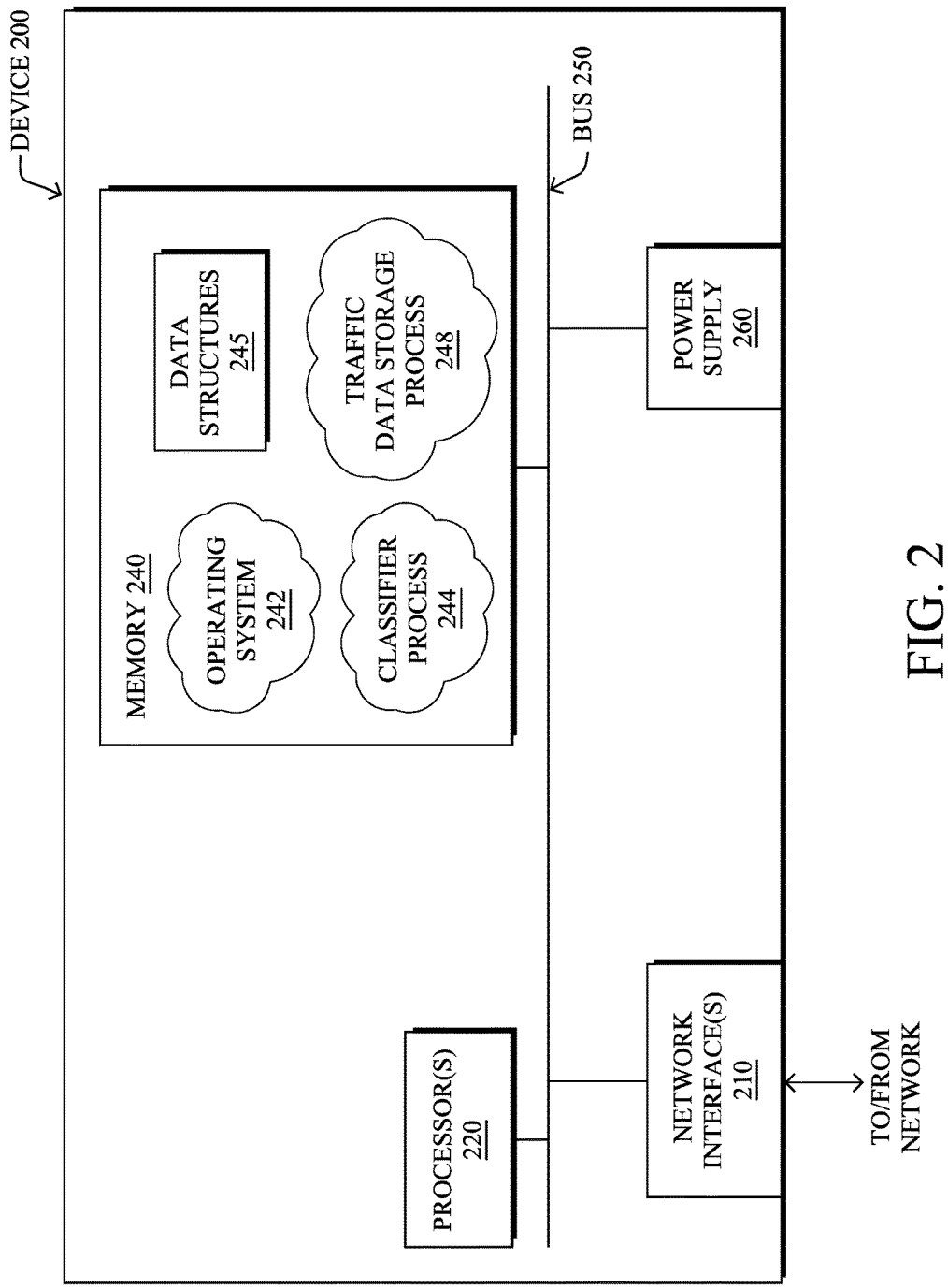
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise classifier process 244 and/or a traffic data storage process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, classifier process 244 may execute one or more machine learning-based classifiers to classify traffic data regarding traffic in the network for any number of purposes. In one embodiment, classifier process 244 may assess captured traffic data to determine whether a given traffic flow or set of flows are caused by malware in the network. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, classifier process 244 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 244 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 244 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 244 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 244 may assess the captured traffic data on a per-flow basis. In other embodiments, classifier process 244 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Traffic data storage process 248 may operate in conjunction with classifier process 244 to control the storage of the captured traffic data (e.g., to one or more persistent storage devices). In particular, as described in greater detail below, traffic data storage process 248 may determine a storage priority for the traffic data associated with a given traffic flow based on the output of classifier process 244. In turn, as described in greater detail below, traffic data storage process 248 may associate a storage time period with a particular set of traffic data as a function of this priority. For example, traffic data storage process 248 may opt to store one traffic record classified by classifier process 244 as malware-generated for a longer period of time than that of another traffic record classified by classifier process 244 as normal. In some cases, traffic data storage process 248 may retain traffic data indefinitely based on their priorities. For example, traffic data storage process 248 may retain traffic data regarding the n-number of most anomalous traffic flows on a rolling basis. In other words, traffic data storage process 248 may continually or periodically ensure that only the most relevant or interesting traffic data is retained in persistent storage. In other embodiments, traffic data storage process 248 may simply set a hard expiration date for each set of traffic data based on the priority of the set. After expiration of the storage time period, traffic data storage process 248 may perform a cleanup of the stored traffic data, such as by deleting the data, overwriting the data, offloading the data to another storage repository, compressing the data, combinations thereof, or the like.

Figure 3:
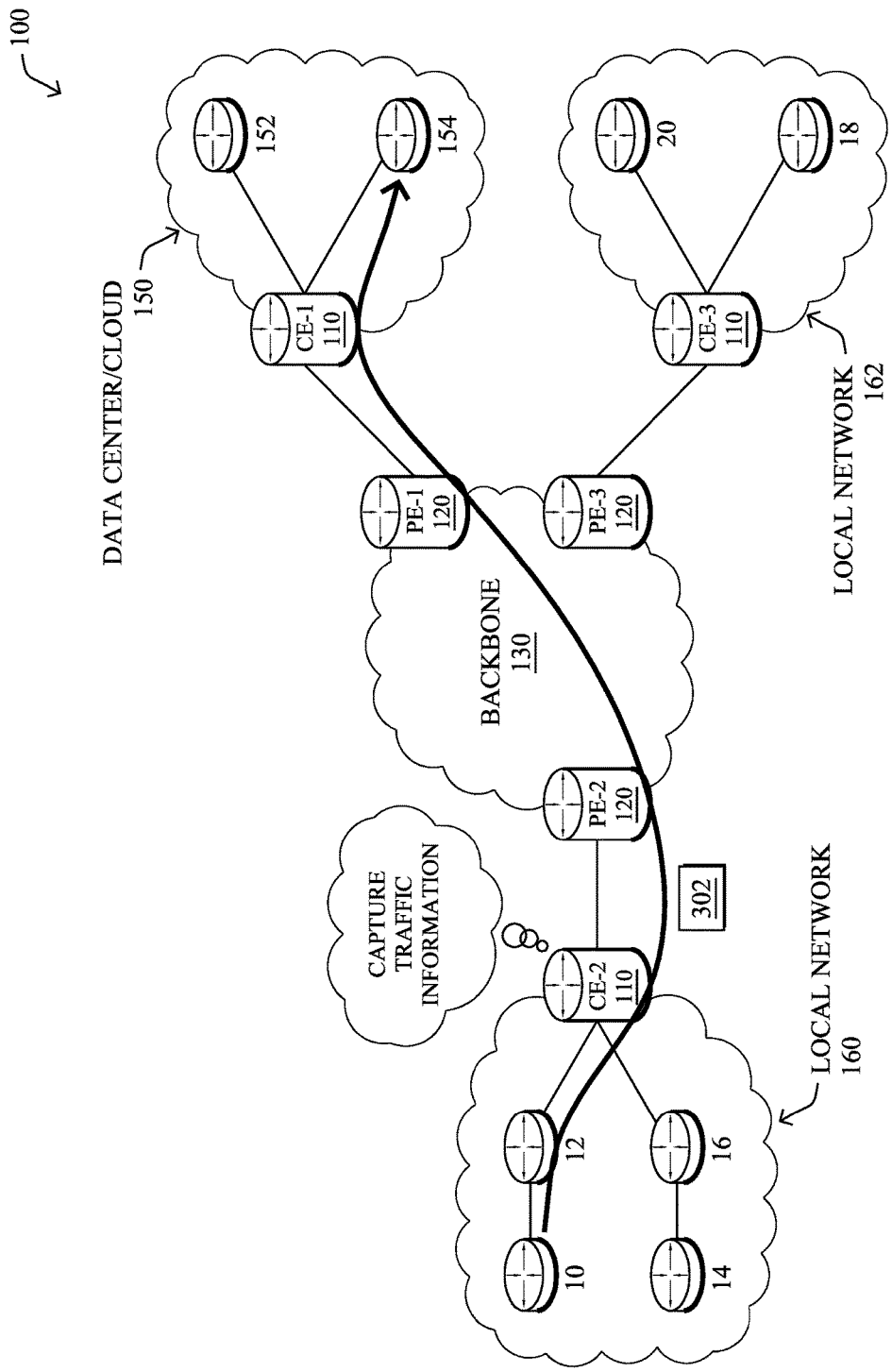
FIG. 3 illustrates an example of a network device capturing traffic data.

As shown in FIG. 3, various mechanisms can be leveraged to capture information about traffic in a network. For example, consider the case in which host node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, captured traffic data can enable a device to perform network forensics and retrospective detection at a later time. Notably, this data can be checked against future threat intelligence (e.g., a list of known "bad" IP addresses, as done in retrospective detection) and analyzed to make sense of attacks (e.g., as is done in network forensics). Anomalies appearing in the captured traffic data can be subjected to further analysis, as well.

In many cases, however, there are insufficient resources to store captured traffic data indefinitely in a network. For example, traffic records captured by Netflow from Cisco Systems, Inc. for a 10 gigabit link with 37% utilization can generate over 5 terabytes of traffic records per month. Thus, the amount of traffic data generated by a network may greater than the amount of nonvolatile storage available at the traffic data repository. Accordingly, tradeoffs may be required to determine which traffic data is retrained and for how long.

Using a Machine-Learning Classifier to Assign a Data Retention Priority

The techniques herein use the output of a machine learning classifier to determine a retention time period for captured traffic data regarding one or more traffic flows in a network. This makes a more effective use of available storage whereby data regarding flows believed to be benign are stored for a shorter term, whereas data about flows deemed malicious or otherwise of interest are retained for a longer period of time.

Specifically, according to one or more embodiments of the disclosure as described in detail below, a device in a network receives traffic data regarding one or more traffic flows in the network. The device applies a machine learning classifier to the traffic data. The device determines a priority for the traffic data based in part on an output of the machine learning classifier. The output of the machine learning classifier comprises a probability of the traffic data belonging to a particular class. The device stores the traffic data for a period of time that is a function of the determined priority for the traffic data.

Illustratively, the techniques described herein may be performed by hardware, software, and/or firmware, such as in accordance with traffic data storage process 248, which may include computer executable instructions executed by the processor 220, to perform functions relating to the techniques described herein, e.g., in conjunction with classifier process 244.

Operationally, the techniques herein make more effective use of storage resources by prioritizing the storage of data that is most likely to be needed in the future. In particular, the storage priority is a function of the output of machine learning classifier that analyzes the traffic data, according to various embodiments.

Figure 4A:
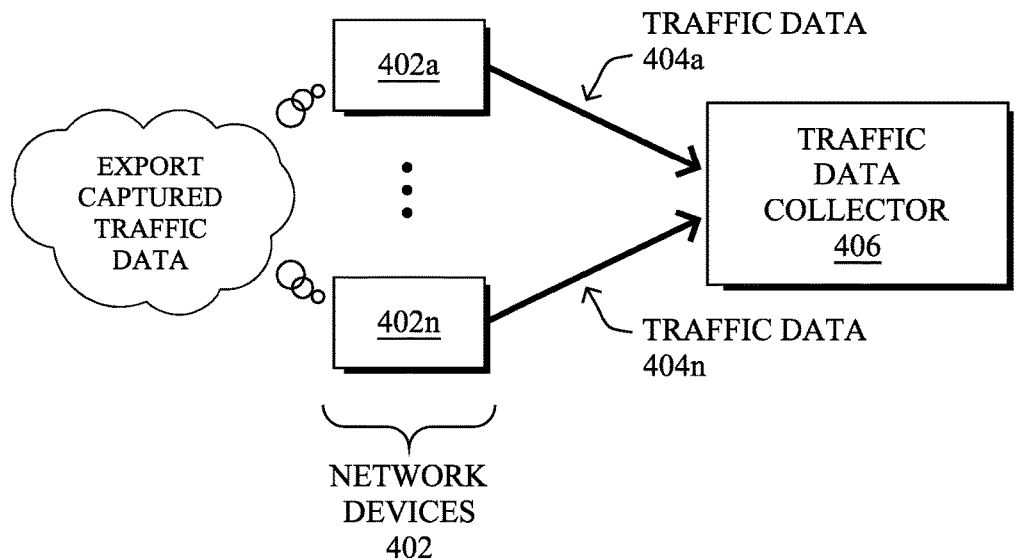
FIGS. 4A-4E illustrate examples of a network device collecting and storing traffic data.

FIGS. 4A-4E illustrate examples of a network device collecting and storing traffic data, in accordance with the embodiments herein. As shown in FIG. 4A, any number of networking devices 402 (e.g., a first through nth networking device) may capture traffic data 404 by analyzing packets of traffic in the network. For example, traffic data 404 may comprise Netflow traffic records, IPFIX data, or any other information regarding traffic flows in the network.

Generally, traffic data 404 may fall into any or all of the following categories:
  Captured Packets—e.g., the packet headers and payloads of the packets in the flow.
  Flow Data—e.g., address(es), port(s), protocol, application, start time, stop time, etc., of a flow, etc.
  Intra-Flow Data—e.g., the lengths and arrival times of each packet in the flow, the distribution of bytes within the flow, selected header fields (e.g., HTTP URL, DNS name, etc.), or any other information regarding the 'inside' of a traffic flow.

As would be appreciated, networking devices 402 may include any number of Layer 2 and/or Layer 3 devices such as, but not limited to, switches, routers, gateways, firewalls, or other networking devices that may convey packets along the network.

In various embodiments, networking devices 402 may export their collected traffic data 404 to one or more traffic data collectors in the network, such as traffic data collector 406. Traffic data collector 406 may be a dedicated repository for traffic data 404 or, alternatively, may be another networking device in the network (e.g., a field-area router in an IoT network, etc.). For example, networking device 402a may report its captured traffic data 404a to traffic data collector 406 periodically, on demand, or at any other time.

Generally speaking, the system may regard a traffic flow as a set of packets from one address and port to another address and port during a relatively short period of time. The system may also regard two flows between the same set of addresses and ports as part of a bidirectional session. To distinguish different traffic flows, networking devices 402 and/or traffic data collector 406 may associate a flow key with any captured traffic data 404 regarding the flow. For example, a flow key may be based on the source address, source port, destination address, destination port, and protocol for the traffic flow, as well as the start and stop times of the flow.

In some embodiments, the system temporarily stores the set of network packets that comprise a flow, in such a way that they can be accessed using the flow key and flow start time as an index. Similarly, intra-flow data is temporarily stored using the same indexing scheme. During testing, it was found that flow records can be stored in approximately 21 bytes, while intra-flow traffic data can consume several hundred bytes of storage. In addition, the actual packets themselves that are captured can range from several kilobytes to multiple megabytes or more.

Figure 4B:
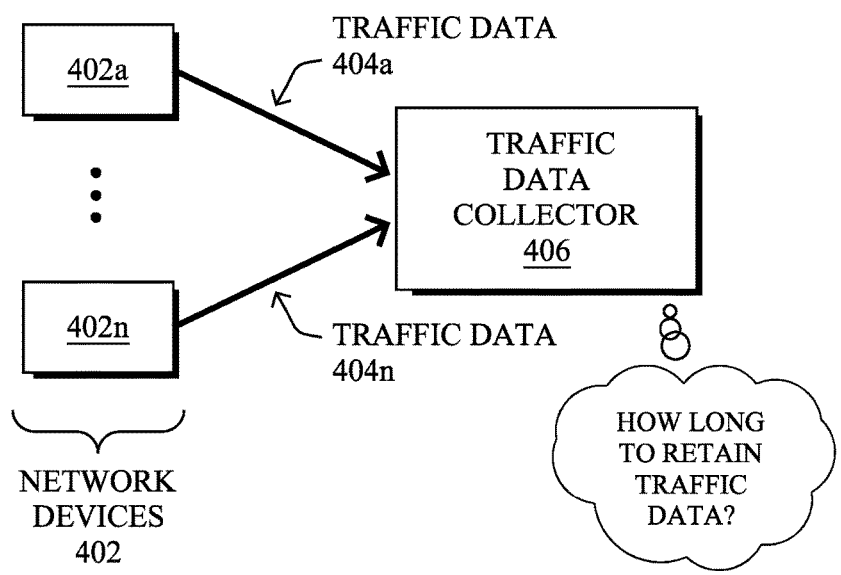

As shown in FIG. 4B, on receipt of a given set of traffic data 404, traffic data collector 406 may determine an appropriate amount of time that the set of traffic data 404 should be retained for purposes of retrospective detection, network forensics, and other analysis. Traffic data collector 406 may, as described in greater detail below, base the storage time period on the output of a classifier, such as a classifier configured to assess whether the associated traffic flow is malware-generated, anomalous, or otherwise of interest for future analysis.

Figure 4C:
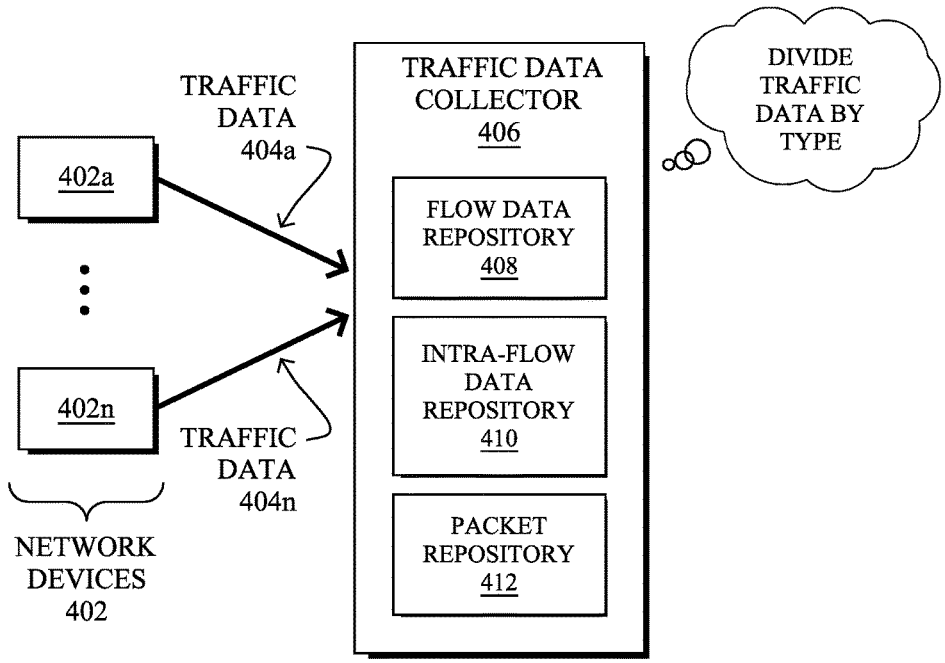

An example of traffic data collector 406 is shown in greater detail in FIG. 4C, according to some embodiments. As shown, traffic data collector 406 may include a flow data repository 408, an intra-flow data repository 410, and/or a raw packet repository 412. Repositories 408-412 may each reside in nonvolatile memory of traffic data collector 406 and may be sized accordingly. For example, packet repository 412 may be larger than flow data repository 408, since captured raw packets tend to be much larger than captured flow data regarding the packets and traffic flow. In some embodiments, traffic data collector 406 may divide traffic data 404 according to its types for storage in the corresponding repositories 408-412.

Figure 4D:
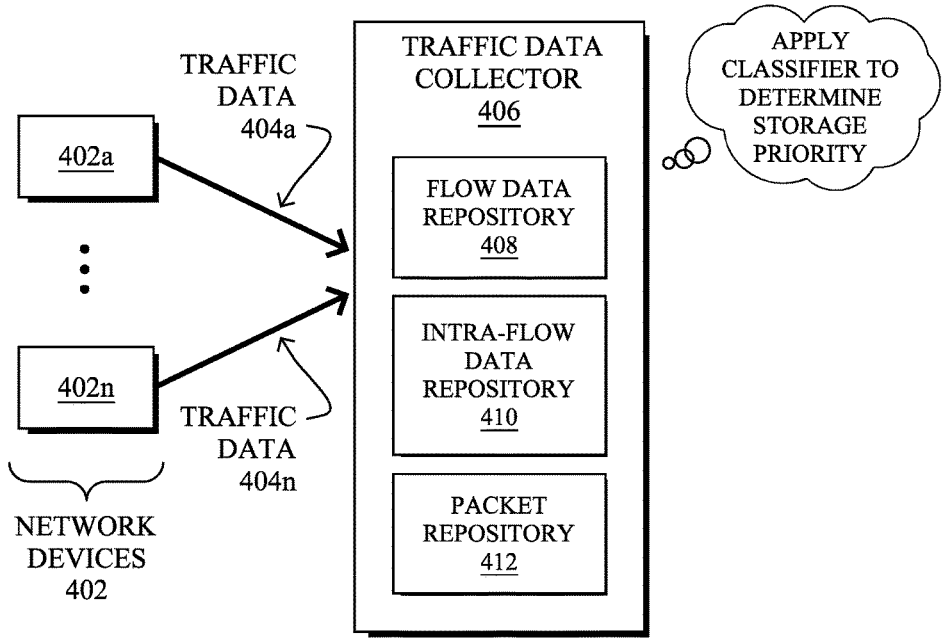

As shown in FIG. 4D, traffic data collector 406 may analyze the received traffic data 404 using one or more machine learning classifiers and/or a set of rules. For example, traffic data collector 406 may apply a malware detection classifier to traffic data 404, to identify traffic data for a traffic flow associated with potential malware.

In various embodiments, traffic data collector 406 may determine a storage priority for a set of received traffic data 404 based on the output of the machine learning classifier. In some embodiments, the storage priority may be a function of the classification itself (e.g., normal, malware-generated, etc.). Typically, such an output is represented as one or more probabilities for the different classifications. For example, the classifier may determine that there is a probability of 0.65 that the associated traffic flow was malware-generated. Thus, in some embodiments, the storage priority may fall along a range of values instead of simply taking a binary approach (e.g., malware-generated flows receive one priority and benign/normal flows receive another). In further embodiments, the storage priority may also be a function of a confidence value or other metric associated with the output of the classifier (e.g., an anomaly score, a measure of pattern similarity, a rarity/strangeness metric for a given set of data, feedback regarding prior classifications, etc.).

Traffic data collector 406 can determine a storage priority of traffic data 404 for a particular flow by performing any or all of the following:

applying the machine learning classifier to flow/intra-flow data in traffic data 404 on a per-flow basis, to identify suspicious flows (e.g., a flow that is similar to previously observed malware communications);

selecting flows to or from a particular address for monitoring (e.g., using a preconfigured set of hosts to be monitored or determined by applying machine learning to flow/intra-flow data for multiple flows;

employing an unsupervised learning system to prioritize anomalous traffic flows for longer storage.

Figure 4E:
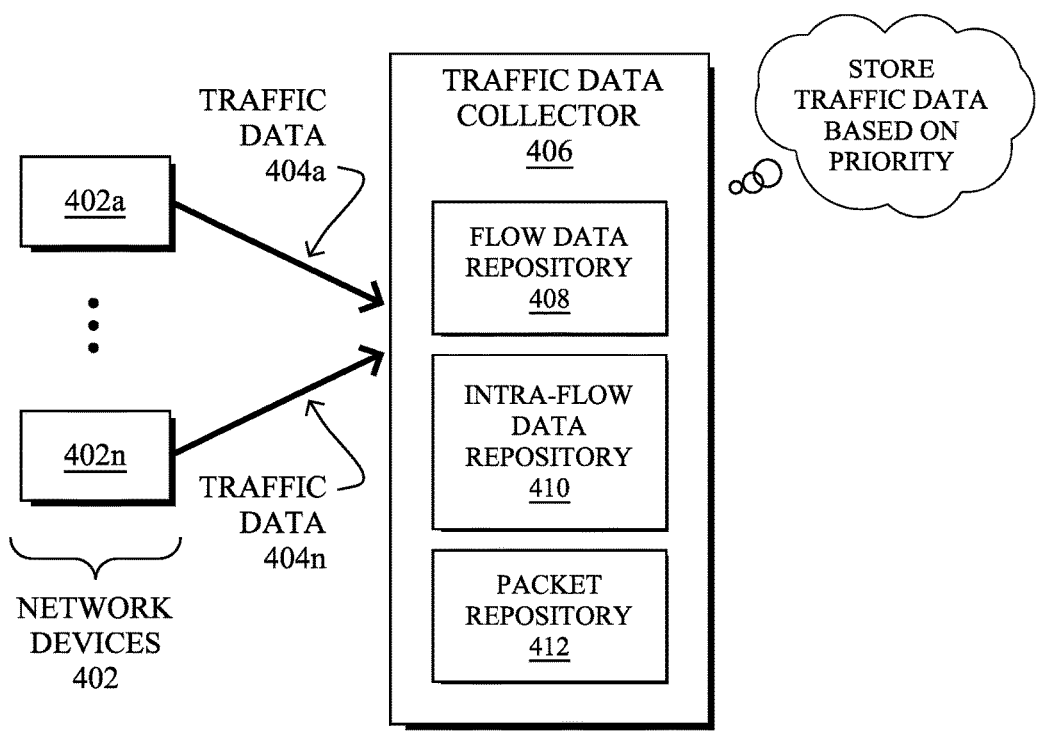

As shown in FIG. 4E, traffic data collector 406 may store traffic data 404 for a period of time that is based on the determined priority score for a given set of traffic data 404. In some embodiments, traffic data collector 406 may store the received traffic data 404 in a corresponding repository 408-412 based on the type traffic data. For example, if the classifier indicates that raw packets should be retained, traffic data collector 406 may store the packet data in nonvolatile packet repository 412. In one embodiment, raw packets in traffic data 404 may be included in a packet capture (PCAP) file sent to traffic data collector 406 from the corresponding networking device 402.

In one embodiment, traffic data collector 406 may further base the storage time period for a particular set of traffic data 404 on the destination repository 408-412. For example, traffic data collector 406 may set the storage time period of packets for a flow of interest at a different length than the corresponding flow or intra-flow data for the particular traffic flow.

Figure 5A:
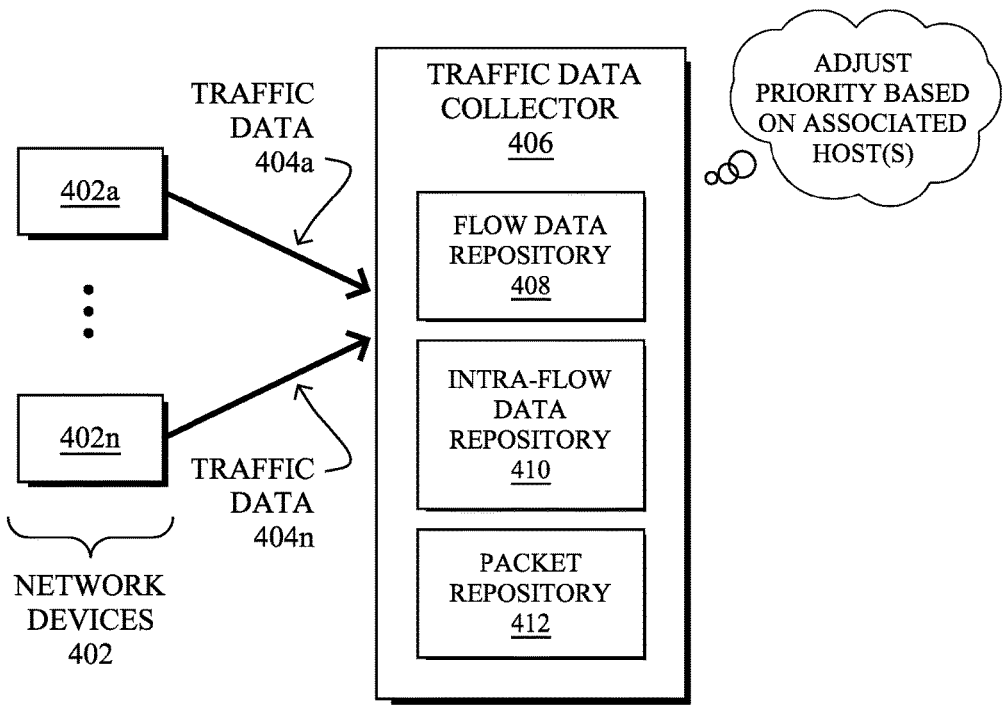
FIGS. 5A-5B illustrate examples of a networking device adjusting a storage priority for captured traffic data.
Figure 5B:
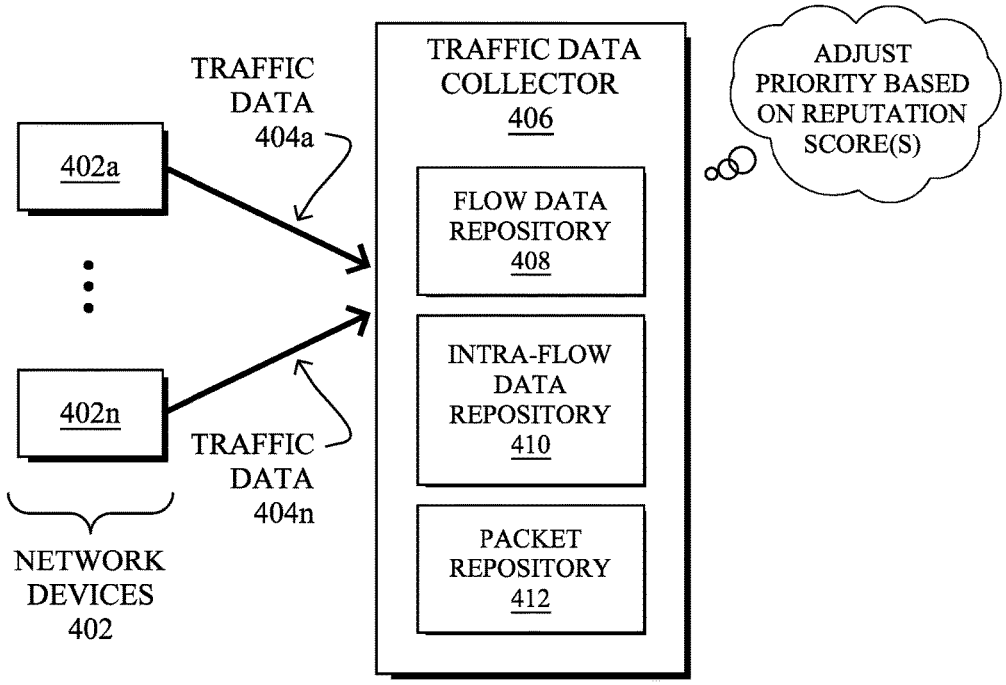

FIGS. 5A-5B illustrate examples of a networking device adjusting a storage priority for captured traffic data, according to various embodiments. In various embodiments, traffic data collector 406 may base the storage priority of a set of traffic data on any number of factors, in addition to the output of the machine learning classifier. For example, as shown in FIG. 5A, traffic data collector 406 may further base the storage priority for a set of traffic data 404 on the host(s) associated with the traffic flow. For example, traffic data collector 406 may maintain a list of high priority hosts that warrant additional attention by the forensics or retrospective detection mechanism and increase the storage priority for any traffic data for flows involving these hosts.

As shown in FIG. 5B, another factor that can be used to affect the storage priority is the concept of a reputation score. In particular, traffic data 404 can be stored for later analysis not only based on the output of the machine learning classifier, but also on any reputation scores associated with the corresponding user, host, and/or server involved in the traffic flow. In various embodiments, traffic data collector 406 or another device in communication therewith may calculate a reputation score based on static parameters. For example, traffic data collector 406 may use one or more reputation scores regarding a user profile, user group to which the user belongs, the role of the user in the company, the device type operated by user, the port(s) and/or address (es) of the traffic flow, an application associated with the traffic flow, a protocol used by the traffic flow, etc. Of note is that certain traffic flows may be of greater interest based on their characteristics. For example, certain users (e.g., the CEO of a company) or resources (e.g., servers) may have an increased chance of being targeted by an attack (e.g., ransomware that will launch an attack or destroy data unless a payment is made, etc.).

The reputation score may also be based on dynamic parameters such as the number of times the user or host was the subject of a targeted network attack, the number of times the host device has been infected with malware, etc. Said differently, the system may take into account one or more reputation scores regarding characteristics of the traffic flow. The reputation score of the server can be obtained from various mechanisms such as OpenDNS, Beaker, etc.

In some cases, a reputation score may be unknown. For example, peer-to-peer (P2P) communications may lack a server reputation score, as the server in such a communication may operate as a user/host device in other traffic flows. If a reputation score is unknown, traffic data collector 406 may treat the unknown reputation score as an indication that the associated traffic data 404 should be retained for a longer period of time. In another embodiment, traffic data collector 406 may apply a reputation score based on the geographic location associated with a remote peer. For example, one country may be associated with a greater number of cyberattacks or hacking attempts than another country. In such a case, traffic data collector 406 may assign a reputation score to a peer in a P2P communication based on the country or other locality in which the peer is located.

The reputation score(s) of the user, host, server, etc. combined with the output of the machine learning classifier will help to prioritize the storage of traffic data 404. For example, assume that traffic data collector 406 classifies a particular set of traffic data 404 as malicious. In such a case, traffic data collector 406 may assign a higher storage priority to the set of traffic data than other traffic data deemed benign. However, now consider the case in which a set of traffic data 404 is deemed benign but the reputation score(s) associated with the traffic flow (e.g., the user or devices involved) are low or unknown. In such a case, traffic data collector 406 may increase the storage priority of the set of traffic data 404, despite the finding that the traffic flow is likely benign.

As would be appreciated, further embodiments provide for the mechanisms herein to be implemented on the networking devices that gather the gather the traffic data. For example, networking devices 402 may locally apply storage priorities to any collected traffic data 404, prior to sending traffic data 404 to traffic data collector 406. In turn, traffic data collector 406 and/or the sending networking device 404 may use the computed priority to control the storage lifespan of the data. For example, if a particular networking device 402a only reports traffic data 404a periodically to traffic data collector 406, networking device 402a may apply a local storage priority to a particular set of traffic data before reporting the set to traffic data collector 406.

Figure 6:
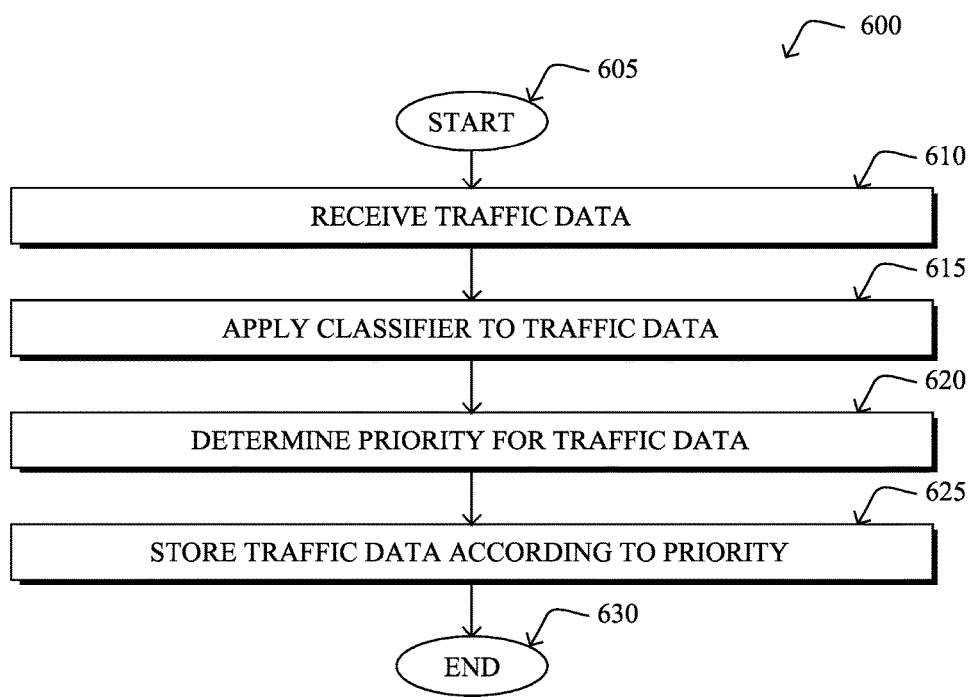
FIG. 6 illustrates an example simplified procedure for storing traffic data according to a storage priority.

FIG. 6 illustrates an example simplified procedure for storing traffic data according to a storage priority, in accordance with one or more embodiments described herein. For example, a non-generic, specifically configured device (e.g., device 200) may perform procedure 600 by executing stored instructions (e.g., processes 244, 248). The procedure 600 may start at step 605, and continues to step 610, where, as described in greater detail above, the device may receive traffic data regarding one or more traffic flows in the network. In some embodiments, the device may be a networking device through which the traffic flows (e.g., a router, etc.). In other embodiments, the device may be configured to operate as a traffic data collector that receives traffic data from one or more other devices in the network (e.g., a set of deployed routers, etc.). In various embodiments, the traffic data may include, but is not limited to, actual packets of the traffic flow(s), flow data (e.g., the addresses, ports, protocols, applications, start/stop times, etc. of a flow), and/or intra-flow data (e.g., lengths and arrival times of each packet in a flow, the distribution of bytes in the flow, header fields, etc.).

At step 615, as detailed above, the device may apply a machine learning classifier to the traffic data. In one embodiment, the device may apply such a classifier to the flow and/or intra-flow data on a per-flow basis, to identify suspicious flows. In another embodiment, the device may select flows to and/or from a particular address for assessment by the classifier. In further embodiments, the device may apply the classifier to traffic data for a plurality of traffic flows or use an unsupervised learning technique, to detect anomalous traffic flows.

At step 620, the device may determine a storage priority for the traffic data, as described in greater detail above. In some embodiments, the storage priority may be based in part on an output of the machine learning classifier. In one embodiment, if an output of the classifier indicates a probability of the traffic data belonging to a particular class, the device may base the storage priority for the traffic data on the probability. For example, if the classifier determines that the traffic data is suspicious, malicious, etc., the storage priority for the traffic data may be determined on a sliding scale that corresponds to the probability of the traffic data being suspicious, malicious, etc. (e.g., a traffic flow that has a 99% probability of being malicious may be stored for a longer period of time than a traffic flow that has a 50% probability of being malicious).

At step 625, as detailed above, the device may store the traffic data for a period of time that is a function of the determined priority for the traffic data. In other words, the device may prioritize the storage lifespan of the traffic data in persistent storage based on the storage priority of the data. In some cases, the storage priority may be converted directly into the storage period of time. For example, the device may retain traffic data that is 75% or more likely to be malicious for thirty days, traffic data that is 50% likely to be malicious for two weeks, etc. In other cases, the device may repeatedly update the storage priority for a given set of traffic data based on the storage priorities of the traffic data for other flows. For example, the device may retain the top n-number of sets of traffic data based on their respective storage priorities.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a memory management system that uses a machine learning classifier to control the storage time of traffic data captured for a traffic flow. Doing so allows for the storage of interesting/malicious traffic data for a period of time that is hundreds of times longer than would otherwise be possible due to constrained storage resources. In addition, it is feasible to build a machine learning flow classifier that has an accuracy of 99.9%, leading to very few cases in which uninteresting/non-malicious traffic data is retained. For instance, assume that information regarding packet lengths, times, and byte distributions for a given flow consumes 100 bytes, which is approximately three times that of traditional Netflow records. If the classifier has a 1% false positive rate, this will still reduce the overall storage requirements by a factor of 100/3=33 times.

While there have been shown and described illustrative embodiments that provide for the computation and use of storage priorities for captured traffic flow information, it is to be understood that various other adaptations and modifications may be made within the spirit and scope of the embodiments herein. For example, while certain embodiments are described herein with respect to using certain machine learning classifiers, other classification techniques can be used in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, traffic data regarding one or more traffic flows in the network;
   applying, by the device, a machine learning classifier to the traffic data;
   determining, by the device, a reputation score for an endpoint device or user profile associated with the traffic data;
   determining, by the device, a data retention priority for the traffic data based in part on an output of the machine learning classifier and the determined reputation score, wherein the output of the machine learning classifier comprises a probability of the traffic data belonging to a particular class; and
   storing, by the device, the traffic data for a period of time based on the determined data retention priority for the traffic data.

2. The method as in claim 1, further comprising:
   determining, by the device, whether the received traffic data comprises flow data for a particular one of the one or more traffic flows, intra-flow data for the particular traffic flow, or raw packet data captured from the particular traffic flow; and
   storing, by the device, the received traffic data in a storage repository of a particular repository type based on whether the received traffic data comprises flow data, intra-flow data, or raw packet data.

3. The method as in claim 2, wherein the period of time is further based on the repository type.

4. The method as in claim 1, wherein applying the machine learning classifier to the traffic data comprises:
   applying the classifier to the traffic data on a per-flow basis to identify a suspicious traffic flow, wherein the classifier is based on prior traffic flows flagged as malicious.

5. The method as in claim 1, wherein the machine learning classifier is an unsupervised classifier configured to evaluate the anomalousness of a traffic flow.

6. The method as in claim 1, further comprising:
   determining, by the device, the data retention priority for the traffic data based in part on whether the traffic data is associated with one or more hosts in a predefined set of hosts.

7. The method as in claim 6, further comprising:
   generating, by the device, the predefined set of hosts based on an analysis of a plurality of traffic flows in the network.

8. The method as in claim 1, wherein the reputation score is determined based in part on prior network attacks associated with the endpoint device or user profile.

9. An apparatus, comprising:
   one or more network interfaces to communicate with a network;
   a processor coupled to the network interfaces and configured to execute one or more processes; and
   a memory configured to store a process executable by the processor, the process when executed operable to:
      receive traffic data regarding one or more traffic flows in the network;
      apply a machine learning classifier to the traffic data;
      determine a reputation score for an endpoint device or user profile associated with the traffic data,
      determine a data retention priority for the traffic data based in part on an output of the machine learning classifier and the determined reputation score, wherein the output of the machine learning classifier comprises a probability of the traffic data belonging to a particular class; and
      store the traffic data for a period of time that is a function of the determined data retention priority for the traffic data.

10. The apparatus as in claim 9, wherein the process when executed is further operable to:
    determine whether the received traffic data comprises flow data for a particular one of the one or more traffic flows, intra-flow data for the particular traffic flow, or raw packet data captured from the particular traffic flow; and
    store the received traffic data in a storage repository of a particular repository type based on whether the received traffic data comprises flow data, intra-flow data, or raw packet data, wherein the period of time is further based on the repository type.

11. The apparatus as in claim 9, wherein the apparatus applies the classifier to the traffic data on a per-flow basis to identify a suspicious traffic flow, wherein the classifier is based on prior traffic flows flagged as malicious.

12. The apparatus as in claim 9, wherein the machine learning classifier is an unsupervised classifier configured to evaluate the anomalousness of a traffic flow.

13. The apparatus as in claim 9, wherein the process when executed is further operable to:

determine the data retention priority for the traffic data based in part on whether the traffic data is associated with one or more hosts in a predefined set of hosts.

14. The apparatus as in claim 13, wherein the process when executed is further operable to:

generate the predefined set of hosts based on an analysis of a plurality of traffic flows in the network.

15. The apparatus as in claim 9, wherein the reputation score is determined based in part on prior network attacks associated with the endpoint device or user profile.

16. The apparatus as in claim 9, wherein the process when executed is further operable to:

receive the traffic data from a plurality of networking devices in the network configured to capture the traffic data, wherein the networking devices comprise at least one of: a router, a switch, or a firewall.

17. A tangible, non-transitory, computer-readable medium storing program instructions that cause a device in a network to execute a process comprising:

receiving traffic data regarding one or more traffic flows in the network;

applying a machine learning classifier to the traffic data;

determining a reputation score for one or more characteristics of the traffic data;

determining a data retention priority for the traffic data based in part on an output of the machine learning classifier and the reputation score for the one or more characteristics of the traffic data, wherein the output of the machine learning classifier comprises a probability of the traffic data belonging to a particular class; and storing the traffic data for a period of time that is a function of the determined data retention priority for the traffic data.

* * * * *